US011912043B2

(12) United States Patent
Charrier et al.

(10) Patent No.: US 11,912,043 B2
(45) Date of Patent: Feb. 27, 2024

(54) THERMAL PRINTING APPARATUS WITH HIGH AGILITY PRINTING SPEED

(71) Applicant: ARMOR, Nantes (FR)

(72) Inventors: Maxime Charrier, Trémentines (FR); Werner Van De Wynckel, Grimbergen (DE)

(73) Assignee: ARMOR, Nantes (FR)

( * ) Notice: Subject to any disclaimer, the term of this patent is extended or adjusted under 35 U.S.C. 154(b) by 0 days.

(21) Appl. No.: 18/257,264

(22) PCT Filed: Dec. 13, 2021

(86) PCT No.: PCT/EP2021/085556
§ 371 (c)(1),
(2) Date: Jun. 13, 2023

(87) PCT Pub. No.: WO2022/128958
PCT Pub. Date: Jun. 23, 2022

(65) Prior Publication Data

US 2023/0398788 A1 Dec. 14, 2023

(30) Foreign Application Priority Data

Dec. 14, 2020 (EP) .................................... 20213802

(51) Int. Cl.
*B41J 2/325* (2006.01)

(52) U.S. Cl.
CPC .................................... *B41J 2/325* (2013.01)

(58) Field of Classification Search
CPC ... B41J 31/06; B41J 31/08; B41J 33/00; B41J 33/14; B41J 33/16; B41J 33/24;
(Continued)

(56) References Cited

U.S. PATENT DOCUMENTS 8,801,306 B2 * 8/2014 Lakin ........................ B41J 35/08
400/234
2004/0135870 A1 7/2004 Furuyama
(Continued)

FOREIGN PATENT DOCUMENTS

EP 0 228 866 A1 7/1987
EP 0 542 270 A2 5/1993
(Continued)

OTHER PUBLICATIONS

International Search Report as issued in International Patent Application No. PCT/EP2021/085556, dated Mar. 17, 2022.
(Continued)

*Primary Examiner* — Kristal Feggins
(74) *Attorney, Agent, or Firm* — Pillsbury Winthrop Shaw Pittman LLP

(57) ABSTRACT

A thermal transfer printing apparatus includes a coater to coat an endless belt ribbon with ink on a coating zone, a printhead to print by thermal transfer a substrate with a part of the ink coated on the endless belt ribbon on a printing zone, a conveyor system supporting and transporting the endless ribbon including ink along a first path from the coater to the printhead and along a second path from the printhead to the coater; a pre-printing buffer to control the length of the first path of the ribbon in the coating zone; and a post-printing buffer to control the length of the second path of the ribbon in the printing zone.

14 Claims, 5 Drawing Sheets

(58) Field of Classification Search
CPC . B41J 33/26; B41J 33/28; B41J 11/005; B41J 11/0055; B41J 11/007; B41J 2/325; B41J 11/00; B41J 11/0035; B41J 11/0025; B41J 11/003
See application file for complete search history.

(56) References Cited

U.S. PATENT DOCUMENTS

| | | | | |
|---|---|---|---|---|
| 2015/0231894 | A1* | 8/2015 | Mochida | B41J 2/325<br>347/213 |
| 2017/0008274 | A1* | 1/2017 | Stangler | B41J 2/325 |
| 2018/0215170 | A1* | 8/2018 | Buckby | B41J 33/36 |

FOREIGN PATENT DOCUMENTS

| | | | |
|---|---|---|---|
| EP | 3 498 475 | A1 | 6/2019 |
| EP | 3 055 135 | B1 | 7/2019 |
| JP | S62-268672 | A | 11/1987 |
| WO | WO 2013/136220 | A1 | 9/2013 |

OTHER PUBLICATIONS

Written Opinion of the International Searching Authority as issued in International Patent Application No. PCT/EP2021/085556, dated Mar. 17, 2022.

* cited by examiner

THERMAL PRINTING APPARATUS WITH HIGH AGILITY PRINTING SPEED

CROSS-REFERENCE TO RELATED APPLICATIONS

This application is the U.S. National Stage of PCT/EP2021/085556, filed Dec. 13, 2021, which in turn claims priority to European patent application number 20213802.0 filed Dec. 14, 2020. The content of these applications are incorporated herein by reference in their entireties.

FIELD OF INVENTION

The present invention relates to a thermal transfer printing apparatus, especially comprising an endless belt ribbon.

BACKGROUND OF INVENTION

Current solutions involving a thermal transfer printing apparatus use a disposable already coated ribbon. One limitation of these solutions is that the ribbon needs to be replaced periodically as the end of the ribbon has been reached. Such replacement requires to stop the printer during a period of time, which could be very inconvenient for some applications, for example when the printer is a labeling machine in a production line.

To overcome this drawback, EP3055135B1 teaches a printing apparatus wherein an endless belt ribbon is used. The belt ribbon is transported with rollers while a part of the belt ribbon is exposed to the thermal printhead and another part is exposed to a coater to recoat the ribbon to replace the ink printed. It is an objective to use a ribbon capable of withstanding a large number of cycles, for example million multiple cycles through the system. This imposes constraints of robustness and reliability to the ribbon composition and the system architecture.

A major drawback of such a system is that it is difficult to fulfills both the coating and the printing requirements.

Indeed, the coating requires a relatively constant speed or requires at least avoiding abrupt change of speed to perform a uniform coating. Furthermore, the lower the coating speed, the longer the ribbon lifetime and the higher the needed recoating energy.

However, the printing requires agility because it needs to reduce the speed between printings and to accelerate quickly to reach a printing speed. Furthermore, the speed of the ribbon should be as fast as possible to improve the printing speed, or the number of labels printed.

Therefore, because EP3055135B1 teaches a belt ribbon, the speed of the ribbon cannot fulfill both requirements. Such printer does not allow both an optimal coating and an optimal printing with high agility required to manage the speed difference.

EP228866A1 describes a printer comprising a buffer mechanism for buffering the movement of the ribbon. However, one drawback of this solution is that the volume of the printer is increased. Furthermore, this solution causes damages to the ribbon because of the high tension applied to the ribbon.

SUMMARY

The present invention aims to provide a thermal transfer printing apparatus and an associated method to overcome the cited drawbacks.

According to a first aspect, the present invention relates to a thermal transfer printing apparatus comprising:

- a coater to coat an endless belt ribbon with ink on a coating zone,
- a printhead to print by thermal transfer a substrate with a part of the ink coated on the endless belt ribbon on a printing zone,
- a conveyor system supporting and transporting the endless ribbon comprising ink along a first path from the coater to the printhead and along a second path from the printhead to the coater in a cyclic manner;
- a pre-printing buffer to control the length of the first path of the ribbon; and
- a post-printing buffer to control the length of the second path of the ribbon.

The two buffers, one on each side of the printhead, advantageously allow creating a variation in the speed of the ribbon between said two buffers in relation to the speed of the ribbon on the coating zone. By adjusting simultaneously of the length of both the first and the second path, the speed of the ribbon in the printing zone may be different and temporarily independent from the speed of the ribbon in the coating zone.

Therefore, during printing, it is possible to keep the speed of the ribbon at a constant low speed while the speed of the ribbon in the printing zone is stopped or rise.

According to another aspect, the thermal transfer printing apparatus comprises:

- an endless ribbon comprising an inner face and an outer face;
- a coating device to coat the endless ribbon with ink on a coating zone,
- a printhead (6) to print by thermal transfer a substrate with a part of the ink coated on the endless ribbon on a printing zone,
- a conveyor system to support and transport the endless ribbon along a path from the coating device to the printhead and from the printhead to the coating device;
- a pre-printing buffer comprising at least two moving rollers to support the coated ribbon during its transport from the coating device to the printhead: a first moving roller arranged to support the inner face of the endless ribbon and a second moving roller arranged to support the outer face of the endless ribbon;
- a post-printing buffer comprising at least two moving rollers to support the ribbon during its transport from the printhead to the coating device: a third moving roller arranged to support the inner face of the endless ribbon and a fourth moving roller arranged to support the outer face of the endless ribbon.

In one embodiment, each moving roller is movable along a predefined trajectory, preferably in a plane sensibly perpendicular to the axis of rotation of the moving rollers.

In one embodiment, the printing apparatus further comprises a first controller configured to:

- control the movement of the first moving roller and second moving rollers along their predefined trajectory to increase or decrease the length of the coated ribbon from the coating device to the printhead; and
- control the movement of the third moving roller and the fourth moving rollers along their predefined trajectory to increase or decrease the length of the ribbon after printing from the printhead (6) to the coating device.

In one embodiment, both the first moving roller and the second moving roller of the same buffer are movable along a circular trajectory around a same axis.

One advantage is to control the amount or the length of ribbon within the buffer zone with one unique motor controlling the rotation of the frame. Another advantage is to reduce the volume of such buffer and therefore the volume of the printer.

In one embodiment, the printing apparatus further comprises a driver, optionally a drive roller, to drive the ribbon at a first speed on the coating zone.

In one embodiment, the printing apparatus further comprises a first controller configured to control the movement of each moving roller along their predefined trajectory to:

- drive the ribbon on the printing zone at a speed inferior to the first speed by driving the pre-printing buffer to reduce the length of the ribbon along the first path and simultaneously by driving the post-printing buffer to increase the length along the second path, and
- drive the ribbon on the printing zone at a speed superior to the first speed by driving the pre-printing buffer to increase the length of the ribbon along the first path and simultaneously by driving the post-printing buffer to decrease the length along the second path.

The first controller advantageously automatically applies a speed differential between the speed of the ribbon on the printing zone and the speed of the ribbon in the coating zone.

In one embodiment, the printing apparatus further comprises a print roller to hold and transport the substrate and the ribbon along the printing zone, the print roller and/or the conveyor system being movable between two configurations: a printing configuration and a disengaged configuration. The printing configuration enables the printing, and the ribbon is supported by contact with the substrate. Preferably, in the printing configuration, the ribbon is in a sandwich between the printhead and the substrate. In the disengaged configuration, the ribbon is disengaged from the substrate and preferably from the printhead.

In one embodiment, the printing apparatus further comprises a second controller. The second controller may command the print roller or the conveyor system to change the configuration between the printing and the disengaged configuration.

In one embodiment, the printing apparatus further comprises a speed sensor to measure the speed of the ribbon within the printing zone.

The second controller may be configured to automatically command the change of configuration when the first controller immobilizes the ribbon on the printing zone or may be configured to control the print roller to automatically switch the configuration of the drive roller when measured speed of the ribbon in the printing zone is null. In one alternative embodiment, the first controller is configured to automatically stop the ribbon on the printing zone while the second controller changes the configuration.

Stopping the ribbon while changing configuration advantageously avoids the friction between the printhead and the ribbon during the change of configuration and therefore prevents the tear of the ribbon.

In one embodiment, a second controller automatically drives the print roller to drive to the substrate a speed equal to the ribbon speed on the printing zone in the printing configuration. This advantageously allows reducing the friction of the ribbon with the substrate.

In one embodiment, the pre-printing buffer and/or the post-printing buffer comprises at least moving rollers. The moving rollers are arranged and designed to hold and transport the ribbon along its path. Each moving roller is movable along a predefined trajectory to modify the length of the ribbon path.

In one embodiment, the moving rollers are movable along a circular trajectory. This advantageously allows reducing the volume of the buffer or to increase the difference between the maximum length and the minimum length of the ribbon path.

In one embodiment, the first axis is parallel to the axis of rotation of each moving roller of the at least one buffer. This advantageously allows providing a compact buffer.

In one embodiment, the printing apparatus further comprises an endless ribbon supported by the conveyor system along the first and the second path. The ribbon is preferably made of a material having a modulus of elasticity inferior to 3 GPa. This material advantageously enables the ribbon to be pulled by the buffers without plastic deformation.

In one embodiment, both the first moving roller and the second moving roller of the same buffer are mounted in a frame, said frame being movable in rotation around an axis sensibly parallel of the axis of rotation of the first and second moving rollers.

In one embodiment, the first controller is configured to control the pre-printing buffer and the post-printing buffer independently one to each other.

In one embodiment, the first controller controls a buffer by controlling the rotation and the direction of rotation of the frame of said buffer, optionally by controlling a motor of the frame.

According to another aspect, the invention relates to a method to print a substrate with a thermal transfer printing apparatus. Preferably, the thermal transfer printing apparatus is the transfer printing apparatus according to the first aspect of the invention.

In one embodiment, said method comprises: driving the ribbon on the coating zone at a first predetermined speed and simultaneously driving the ribbon on the printing zone at a second speed, different from the first predetermined speed.

Driving the ribbon on the printing zone at a second speed, different from the first predetermined speed is performed by:

- driving the moving rollers of the pre-printing buffer to reduce the length of the ribbon from the coating device to the printhead and simultaneously driving the moving rollers of the post-printing buffer to increase the length of the ribbon from the printhead to the coating device, or
- driving the moving rollers of the pre-printing buffer to increase the length of the ribbon from the coating device to the printhead and simultaneously driving the moving rollers of the post-printing buffer to reduce the length of the ribbon from the printhead to the coating device.

In one embodiment, when the second speed is inferior to the first speed, said second speed is reached by driving the pre-printing buffer to increase the length of the ribbon along the first path and simultaneously driving the post-printing buffer to reduce the length along the second path.

This method advantageously allows to abruptly increase or decrease the speed of the ribbon on the printing zone, keeping the ribbon speed on the coating zone constant. This method advantageously provides a high agility printing, a homogeneous coating and an improved lifetime of the ribbon.

In one embodiment, the method further comprising engaging the printing by:

- driving the ribbon on the coating zone at a predetermined speed and simultaneously;
- reducing the ribbon speed on the printing zone by driving the pre-printing buffer to increase the length of the ribbon along the first path and simultaneously driving the post-printing buffer to decrease the length along the second path; and moving the print roller to the printing position while the ribbon speed is reduced on the printing zone;

In one embodiment, the method further comprises operating the printing by driving the ribbon at a printing speed on the printing zone.

In one embodiment, operating the printing further comprises driving the ribbon speed on the printing zone at a speed higher than the speed of the ribbon on the coating zone by driving the pre-printing buffer to reduce the length of the ribbon along the first path and simultaneously driving the post-printing buffer to increase the length along the second path.

In one embodiment, the method further comprises disengaging the printing by:

driving the ribbon on the coating zone at a predetermined speed; and simultaneously;

reducing the ribbon speed on the printing zone by driving the pre-printing buffer to reduce the length of the ribbon along the first path and simultaneously driving the post-printing buffer to increase the length along the second path; and moving the print roller to the disengaged position while the ribbon speed is reduced on the printing zone.

DETAILED DESCRIPTION

The invention will be better understood with the following specification referring to the figures.

Figure 1:
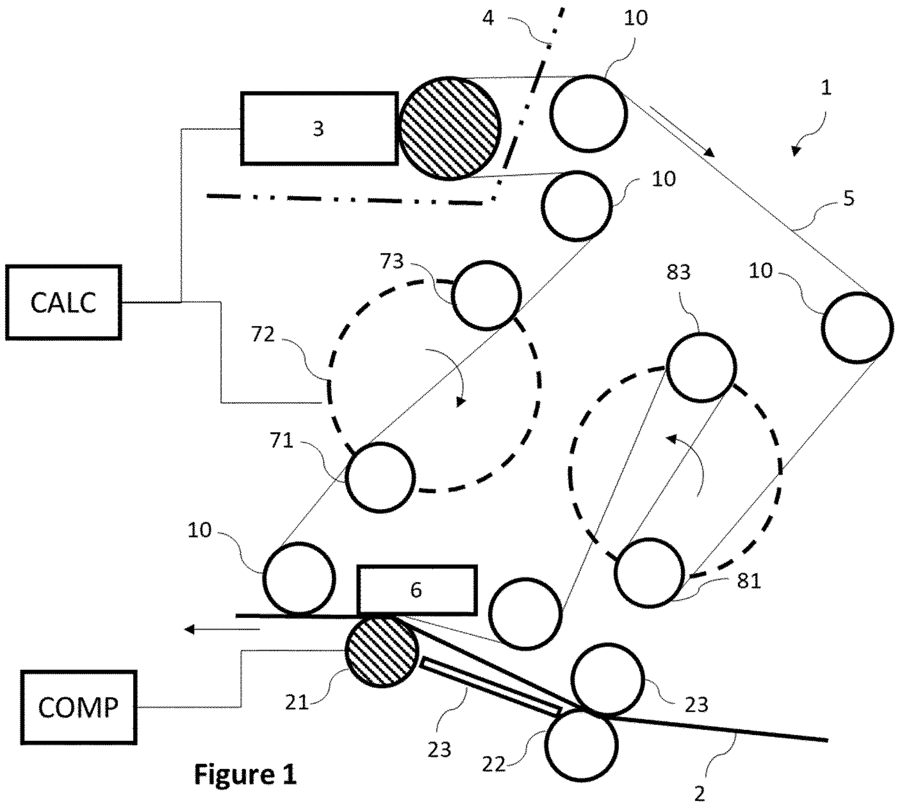
FIG. 1 is a schematic representation of a thermal transfer printing apparatus according to one embodiment wherein it comprises an endless ribbon belt and two buffers, each including movable rollers in a first configuration.
Figure 2:
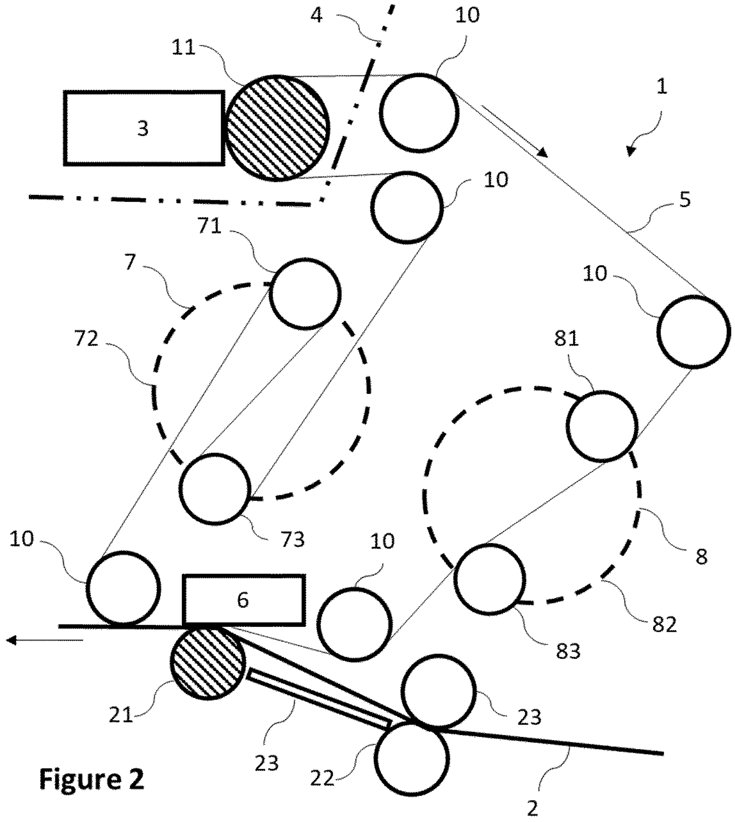
FIG. 2 is a schematic representation of a thermal transfer printing apparatus according to FIG. 1 wherein the movable rollers are in a second configuration.

A preferred embodiment of a printing apparatus 1 according to the invention is now described referring to FIG. 1 and FIG. 2.

The printing apparatus 1 comprises a coater 3 to coat a ribbon with ink and a printhead 6 to print by thermal transfer a substrate with a part of the ink coated on the ribbon. The printing apparatus 1 further comprises a conveyor system. The conveyor system is arranged and designed to hold and support an endless ribbon 5 along a path from the coater 3 to the printhead 6 and from the printhead 6 to the coater 3. The path of the ribbon defines a loop.

Coater

The coater 3 is designed and arranged to coat an outer face of a ribbon 5 with ink.

The coater 3 may be connected to a reservoir (non-illustrated). The reservoir is designed to receive solid ink to feed the coater 3. In one another embodiment, the reservoir may comprise liquid ink and it may be coupled with a mixing element to keep ink in predefined physical conditions, for example in temperature and/or viscosity.

The coater may comprise an ink roller comprising an outer surface in contact with the ribbon and fed with ink by a reservoir.

Alternatively, the coater 3 may comprise a slot-die coating device arranged to coat ink on the outer surface of the ribbon.

The coater (also called "coating device") may also comprise all coating systems known by the skilled person and compatible with the present invention.

The coater 3 may be positioned in contact with or in the vicinity of the ribbon 5 to facilitate the coating of the outer face of the ribbon 5. By "outer face", it should be understood the face of the ribbon outward-facing the loop of the ribbon, in opposition to the inner face. The coater 3 is designed to deposit a layer of hot melted ink on the outer face of the ribbon 5. The layer of liquid ink is preferably distributed homogeneously on the surface of the ribbon 5. An ink control component (not represented) may ensure a distribution of a sufficient quantity of ink on the surface of the ribbon 5 in function of the speed of rotation/displacement of the ribbon 5 and/or the printing mode. The ribbon 5 is coated with hot melted ink by the coater 3 on a coating zone. In one embodiment, the coating zone is defined by a contact between the ribbon and the coater. Preferably, the coating zone is defined by a portion of the path of the endless ribbon wherein the hot melted ink is coated on said ribbon 5. The speed of the ribbon in the coating zone may therefore be defined by the distance traveled by the ribbon along its path in a time interval in the coating zone, i.e., wherein the melted ink is applied to the ribbon 5.

Preferably, the printing apparatus 1 comprises a support 11 holding the ribbon where the ink is deposited in the ribbon to ensure sufficient mechanical stability to the ribbon 5 during coating. In the embodiment illustrated in FIG. 1, said support is a roller. In one embodiment, the ribbon, in the coating zone, is in a sandwich structure between the coater 3 and the support 11. In one embodiment, the coating zone is defined by a portion of the ribbon path wherein the ribbon is supported by the support 11.

The support 11 may comprise a roller, preferably a drive roller.

The reservoir and/or the coater 3 may comprise a heating device to melt the ink in respectively the reservoir and/or the coater 3. The reservoir can be filled with solid ink. The contact of the solid ink with the reservoir or with the coater 3 will readily melt the ink.

In one embodiment, the printing apparatus 1 includes a device to periodically adds new solid ink in the reservoir.

Printhead

The printing apparatus 1 comprises a printhead 6. In one preferred embodiment, the printhead 6 is a thermal transfer printhead 6.

A print roller 21 can be used to transport a substrate 2 proximate to the ribbon 5. The thermal transfer printhead 6 is used to transfer hot melt ink from the ribbon 5 to the substrate 2. The print roller 21 may be designed and arranged to hold and transport the ribbon 5 and the substrate 2.

In one embodiment, a printing zone is defined by a portion of the ribbon path wherein the ribbon 5 is held and supported by the print roller 21. In one embodiment, the printing zone is defined by a portion of the ribbon path wherein the ribbon 5, notably its outer face, is in contact with the substrate 2. In one embodiment, the printing zone is defined by a portion of the ribbon path wherein the coated ink on the ribbon 5 is transferred to the substrate 2.

Therefore, the speed of the ribbon in the printing zone may be defined by the distance traveled by the ribbon along its path in a time interval in the printing zone, i.e., wherein the coated ink on the ribbon is applied to the substrate 2.

The printhead 6 preferably comprises a micro-heater area. Said micro-heater area is in contact with the ribbon, notably its inner face, on the printing zone and heats the ribbon and the ink on said ribbon through the ribbon. The heated ink is then transferred to the substrate. The surface of the micro-heater area may range from 500 $\mu m^2$ to 100 000 $\mu m^2$, preferably from 000 $\mu m^2$ to 20 000 $\mu m^2$. The width of the micro-heater area may range from 40 μm to 300 μm. The length of the micro-heater area may range from 1 to 2 times the width of said micro-heater area. The printhead 6 is preferably arranged in such a way that the axis of the length of the micro-heater area is substantially parallel to the axis of transport of the ribbon in the printing zone.

During printing, the printhead 6 or the micro-heater area is in contact with the inner face of the ribbon 5 to enable the thermal transfer of the ink located in the outer face of the ribbon 5.

In one embodiment, the printhead comprises a protective layer on the surface of the micro-heater area. In this embodiment, during printing, the inner face of the ribbon 5 is sliding in contact with the protective layer. The micro-heater area heats the ink on the ribbon through the protective layer and through the thickness of the ribbon 5.

The protective layer may comprise a sol-gel material, preferably a borosilicate. The protective layer advantageously protects the ribbon from the friction. The thickness of the protective layer advantageously allows heat conduction. The thickness of the protective layer may range from 1 to 50 μm. The protective layer may comprise a sol-gel material, preferably a borosilicate. Such material advantageously avoids high friction between the ribbon and the printhead while the ribbon is sliding on the printhead during printing.

During this printing process, the outer face of the ribbon 5 is in contact with the substrate 2 to transfer a part of ink intended for printing the substrate.

A print roller 21 ensures a sufficient pressure on the substrate 2 to maintain the substrate 2 in contact with the ribbon 5 when printing process is engaged. Said ribbon 5 may be then maintained in a moving sandwich layer between the substrate 2 and the printhead 6 (or the micro-heater area) during the printing process. The movement of the substrate 2 is in the same direction as the displacement direction of the ribbon 5 in the vicinity of the printhead 6. This movement of both the substrate 2 and the ribbon 5 in the vicinity of the printhead 6 are preferably a rectilinear movement.

In an alternative embodiment, the printhead 6 comprises a laser to heat the ink through the thickness of the ribbon 5 in order to enable the thermal transfer 6 of the ink located in the outer face 51 of the ribbon 5. Preferably, the wavelength of the laser is comprised between 950 nm and 1450 nm.

The arrangement between the printhead 6, the ribbon 5 and the substrate 2 may be ensured by mechanical components which are precisely set according to a desired printing precision. Some guides and position control components may be implemented to ensure a predefined arrangement between at least the printhead 6 and the ribbon 5. For example, a deflector 23 may be used to support at least partially the substrate 2.

Ribbon

The ribbon 5 is designed to be implemented in the printing apparatus 1 according to the invention. The ribbon 5 allows the transport of the ink from the coater 3 to the printhead 6 on its outer face. The ribbon 5 is an endless ribbon. By endless ribbon, it should be understood a ribbon forming a loop or a belt ribbon. Then, such ribbon allows being coated and used to print in a cyclic manner. The residual ink, not used during the printing process, is conveyed past the printhead to an ink recovery device (non-illustrated) and recoated. In consequence, the same ribbon 5 is used continuously for conveying ink for printing and for conveying residual ink after the printing. The printing process is implemented such to form a continuous looping process where residual ink is retrieved automatically. This configuration allows retrieving ink which has not been printed. This ink may be advantageously recoated and reused on the next turn of the ribbon 5.

One advantage of the invention is to provide and autonomous printing apparatus where at least a part, preferably 100% or substantially 100% of the ink is used, i.e., without ink loss.

The ribbon 5 can be made of various materials. The ribbon 5 is preferably made of a material with high temperature resistance properties, such as temperature resistance up to 300° C., and high chemical resistance properties, for example a chemical resistant to alcohol, ink or solvents, etc. Preferably, the ribbon 5 is made of polyimide film. The polyimide allows the ribbon to be used at temperatures up to the range [340°-380° ] of temperatures without undergoing deformation. In a preferred embodiment, the ribbon 5 may also be made of metal or metal alloy. The ribbon 5 may be made of metal alloy such as stainless steel, Aluminum alloy, Titanium alloy, Copper alloy, Beryllium alloy. In one embodiment, the ribbon may comprise an alloy comprising Nickel, Tin and Copper, preferably between 14.5% m and 15.5% m of Nickel, between 7.5% m and 8.5% m of Tin, and between 75% m and 79% m of Copper.

In a preferred embodiment, the ribbon 5 is made of material having a modulus of elasticity (also called Young's modulus) inferior or equal to 3 GPa. This advantageously allows the ribbon 5 to support the tension given by the conveyor system without undamaging the ribbon.

The ribbon 5 is preferably made of a material having a heat transfer rate greater than 0.120 Watts/meter-Kelvin.

The thickness and the composition of the ribbon material is designed to create heat transfer through the ribbon allowing the printing.

Preferably, the thickness of the ribbon 5 is inferior to 50 μm or to 20 μm. Said thickness advantageously allows low heat transfer resistance between its inner face and outer face, improving the quality of printing. The thickness of the ribbon 5 may be comprised between substantially 0.5 μm and 50 μm, most preferably between 0.5 μm and 20 μm. In one example, the thickness of the ribbon 5 is chosen in the range [3-25 μm] or [5-10 μm].

In one embodiment where the printhead 6 comprises a laser, the ribbon 5 is transparent in the wavelength of said laser. In said embodiment, the thickness of the ribbon 5 is chosen in the range [3-200 μm].

Conveyor System

The ribbon 5 is held and transported using a conveyor system. The conveyor system supports and transports the ribbon 5 along its path.

The conveyor system may comprise at least one roller 10 to hold and transport the endless ribbon 5. The conveyor system may comprise a plurality of roller 10, 11 which holds and transport the endless ribbon 5 along its path.

At least one of the rollers may be a drive roller 11. The drive roller 11 is connected to a motor to rotate said drive roller 11. At least one battery or an electrical alimentation may be implemented in the printing apparatus to provide power supply to the motor. The rotation of the drive roller 11 generates the displacement of the endless ribbon 5 along its path which also generates the rotation of the other rollers 10.

The rollers 10, 11 are mounted to the frame of the printing apparatus to rotate on itself to transport the ribbon along their circumferential surface. The rollers 10, 11 have a shape of a cylinder and are mounted to the frame of the printing apparatus to rotate around their longitudinal axis.

In one embodiment non-illustrated, the conveyor system comprises at least one conveyor belt. The conveyor belt is designed and arranged to hold and transport the ribbon 5 by its inner face along a portion of the path of the ribbon. The conveyor belt fulfills the same function as a continuous track driving the ribbon 5 in one direction of rotation. In one embodiment, the conveyor belt comprises a parallelogram form sheet that is looped to form a ribbon support. The conveyor belt may be supported by at least two rollers. In another example, the conveyor belt is supported by three rollers to form a triangle. One advantage of the conveyor belt is that the ribbon 5 is carried along a distance between two rollers without undergoing mechanical deformations. The conveyor belt advantageously minimizes the stress on the ribbon 5 which improves the time of life of said ribbon 5. Furthermore, minimizing stress on the ribbon 5 allows avoiding the creation of a ripple profile on the ribbon 5. Moreover, the use of a conveyor belt reduces the risk of wrinkling and of misalignment of the ribbon 5.

Isolating Walls

In one embodiment, the printing apparatus 1 may comprise a frame. The frame includes the coater 3, the printhead 6, the conveyor system and the path of the ribbon 5. The frame comprises at least one aperture for the exit of the substrate 2 printed. In one embodiment, the printing apparatus 1 further comprise isolating walls 4. The isolating walls 4 are arranged to isolate a zone including the coater 3 from the rest of the apparatus. The isolating walls 14 may comprise apertures for the passage of the ribbon 5. One advantage is to contain the heat provided by the coater 3. The coated ink can solidify easier on the ribbon during its transport from the coater to the printing zone.

Double Buffers

The printing apparatus 1 comprises buffers 7, 8. Buffers define a zone wherein a portion of the ribbon path is controlled by said buffers. A buffer can control the ribbon path in such a way that it can increase or reduce the length of the ribbon path inside the zone defined by the buffer or through the buffer. Therefore, the buffers are configured and arranged to shorten or lengthen the length of a portion of the ribbon's path.

The ribbon 5 is conveyed along a path comprising a first path (from the coating zone to the printing zone) and a second path (from the printing zone to the coating zone).

The first path of the ribbon comprises the part of the ribbon which has been re-inked (also called "re-inked" ribbon) which is transported from the coater 3 (or the coater zone) to the printhead 6 (or to the printing zone). The second path of the ribbon comprises the other part of the ribbon which has been printed (also called "printed-ribbon") or comprising the remaining ink after the printing which is transported from the printhead (or the printing zone) to the coater 3 (or to the coating zone).

The printing apparatus 1 according to the invention includes a pre-printing buffer 8 in the first path of the ribbon and a post-printing buffer 7 in the second path of the ribbon. Therefore, the pre-printing buffer 8 controls the length of the first path of the ribbon and the post-printing buffer 7 controls the length of the second path of the ribbon.

In other words, the pre-printing buffer 8 is designed to buffer a predefined portion of the re-inked ribbon and the post-printing buffer 7 is designed to buffer a predefined portion of the printed-ribbon.

By "designed to buffer", it should be understood that each buffer is designed to store a variable amount or length of ribbon thereon. Said amount length of ribbon may be defined between an entry and an exit of said pre-printing buffer 8 or post-printing buffer 7.

In one preferred embodiment, the driver 11 is located to drive the ribbon 5 at a first speed on the coating zone. Preferably, the driver 11 is located between the pre-printing buffer 8 and the post-printing buffer 7, on the side of the coating zone.

The two buffers 7, 8 on each side of the printing zone advantageously allows driving the ribbon 5 on the printing zone at a second speed which is different from the first speed of the ribbon in the coating zone driven by the driver 11.

Indeed, when the length of the first path is reduced by the pre-printing buffer 8 and simultaneously the length of the second path is increased by the post-printing buffer 7, the speed of the ribbon 5 on the printing zone is superior to the speed of the ribbon in the coating zone.

In another way, when simultaneously the length of the first path is increased by the pre-printing buffer 8 and the length of the second path is reduced by the post-printing buffer 7, the speed of the ribbon on the printing zone is inferior to the speed of the ribbon in the coating zone.

Buffers

Preferably the buffers 7, 8 comprise moving rollers 71, 81 located and arranged to hold and transport the ribbon 5. The position of said rollers 71, 81 defines the path of the ribbon 5 through the buffers 7, 8. In one embodiment, each buffer 7, 8 comprises at least one of the moving rollers arranged to support the ribbon by its inner face and comprises at least one moving roller arranged to support the ribbon by its outer face. Each moving roller 71, 83, 73, 81, is mounted to the frame of the printing apparatus to rotate on itself to transport the ribbon along its circumferential surface. Each moving roller 71, 83, 73, 81, has a shape of a cylinder and is mounted to the frame of the printing apparatus to rotate around their longitudinal axis.

In addition, each moving roller is also free to move along a predefined trajectory 72, 82, 92.

The movement of the moving rollers 72, 82, 92 along their predefined trajectory 72, 82, 92 increases or reduces the amount of ribbon stored within the buffer or the length of the ribbon between the entry and the exit of the buffer.

As illustrated in FIGS. 1 and 2, the pre-printing buffer comprises a first moving roller 81 to support the inner face of the ribbon 5 and a second moving roller 83 to support the outer face of the ribbon 5. In the same way, the pre-printing buffer 7 comprises a third moving roller 71 to support the inner face of the ribbon 5 and a second moving roller 73 to support the outer face of the ribbon 5. Because each buffer comprises one roller on both sides of the ribbon, it advantageously allows to increase or decrease the length of the ribbon by moving the said rollers.

In one embodiment, the rollers 71, 81, 73, 83 are movable along a predefined trajectory 72, 82. By movable, it should be understood that the axis of rotation of the roller B is free in translation or in rotation along a predefined trajectory, preferably in a plane sensibly perpendicular to said axis of rotation B corresponding to the longitudinal axis of said rollers.

The movement of the rollers induced a change of the ribbon path which can therefore be shortened or lengthened.

In other words, the movement of the rollers changes the amount of ribbon stored between the entry and the exit of the buffer.

Therefore, in one example, when the amount of ribbon stored between the entry and the exit of the pre-printing buffer is increased or reduced, the length of the inked-ribbon is respectively increased or reduced.

In a second example, when the amount of ribbon stored between the entry and the exit of the post-printing buffer is increased or reduced, the length of the printed-ribbon is respectively increased or reduced.

In one embodiment, when the length of the inked-ribbon is increased or reduced, the length of the printed-ribbon is automatically respectively reduced or increased.

In a first embodiment illustrated in FIG. 1 and FIG. 2, the buffer 7, 8 comprises two rollers 71, 81. Both rollers 71, 81 of the same buffer are movable along a predefined trajectory (in dotted lines) 72, 82. The movement of the rollers of a same buffer may be synchronized or simultaneous.

As illustrated in FIG. 1, the pre-printing buffer 8 is in a long configuration wherein the length of the first path is maximum. As illustrated in the FIG. 2, the rollers 81 of the pre-printing buffer 8 may be displaced to reach a short configuration wherein the length of the first path is minimum. In one embodiment, the ratio between the maximum length over the minimum length of the path of the ribbon between the entry and the exit of the buffer is superior to 1.3, preferably comprised between 1.3 and 3.

FIG. 1 and FIG. 2 illustrate an embodiment wherein the rollers 71, 81 of a buffer 7, 8 are movable along a circular trajectory 72, 82. The rotation of both rollers around a same axis allows to "wind" or "unwind" the ribbon 5 in the buffer zone and therefore respectively increase or decrease the length of the ribbon of the first path or the second path. This embodiment of buffer advantageously provides compact buffers in both the long and the short configuration. The "buffer zone" may be defined between the entry and the exit of the buffer. The entry and the exit of the buffer, or the limits of the buffer zone may be defined by the two adjacent rollers 10 on both sides of the buffer 7, 8, 9. For example, the entry of the buffer zone is defined by the contact between the ribbon and the previous roller of the buffer, and the exit is defined by the contact between the ribbon and the succeeding roller of the buffer.

The terms "previous roller" and "succeeding roller" should be understood here as the closest rollers of the conveyor system 2 supporting the ribbon 20 respectively before and after the buffering system according to the direction of transport of the ribbon 20.

In another embodiment, the entry of the pre-printing buffer is the coating zone and the exit of said pre-printing buffer is the printing zone. In consequence, the exit of the post-printing buffer is the coating zone and the entry of said post-printing buffer is the printing zone.

Figure 8:
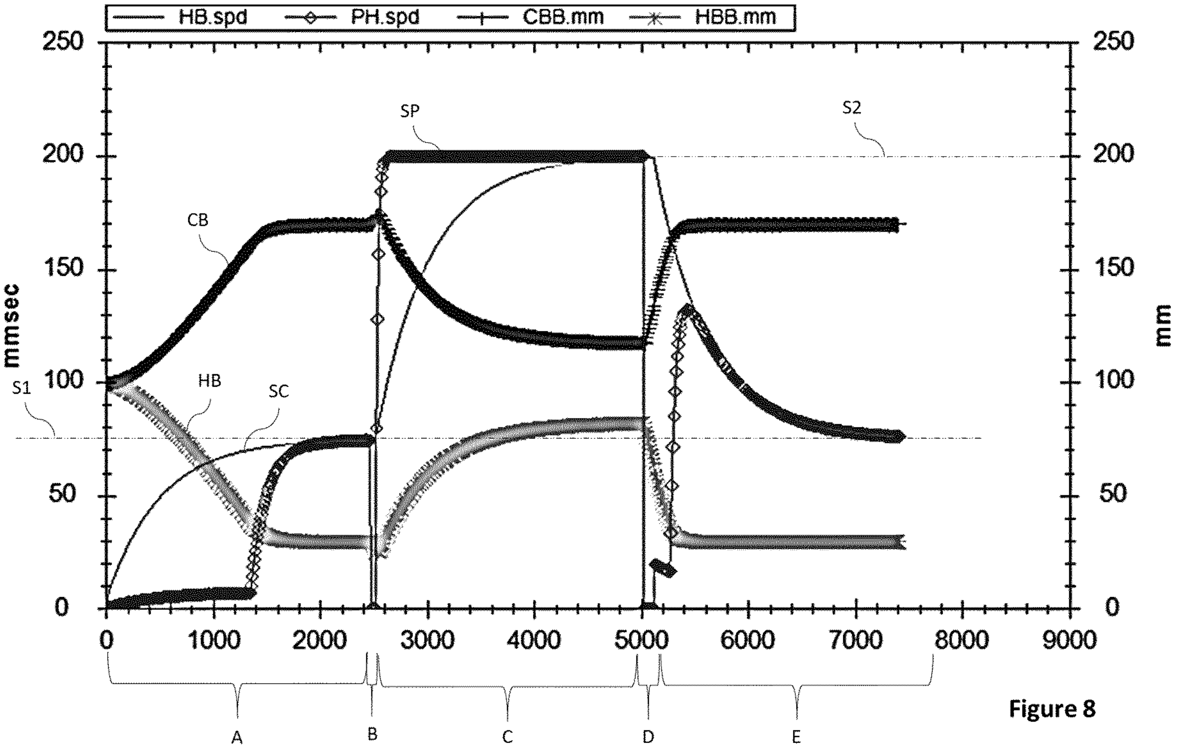
FIG. 8 is a graph representing the printing of several labels according to an embodiment of the invention. The graph represents the speed of the ribbon in both the coating zone and the printing zone and the length of the path of the ribbon through both the pre-printing buffer and the post-printing buffer.

FIG. 8 illustrates an embodiment of such buffer. Said buffer comprises a frame 84. The frame is mounted on the printing apparatus with one degree of freedom in rotation around an axis A. The frame 84 may comprise a pivot 85 around which the frame is rotatable.

The rollers 81 are mounted on the frame 84. The rollers 81 may be mounted on the frame 81 with one degree of freedom in rotation around an axis B to transport the ribbon on their outer surface. In one embodiment, the axis A of rotation of the frame 84 is parallel to the axis of rotation B of the rollers 81.

Therefore, the rotation of the frame 84 on its axis A allows a simultaneous movement of both rollers 81 along a curved trajectory 82. Said trajectory causes winding or unwinding the ribbon 5 to respectively increase or decrease the path of the ribbon, depending on the direction of rotation of the frame 84. This embodiment advantageously provides a buffer 8 wherein only one motor is needed to move both rollers 81 of the same buffer 8 along their predefined trajectory 82. The number of motors can be advantageously reduced and the printing apparatus 1 is advantageously less complex and more compact.

Figure 5:
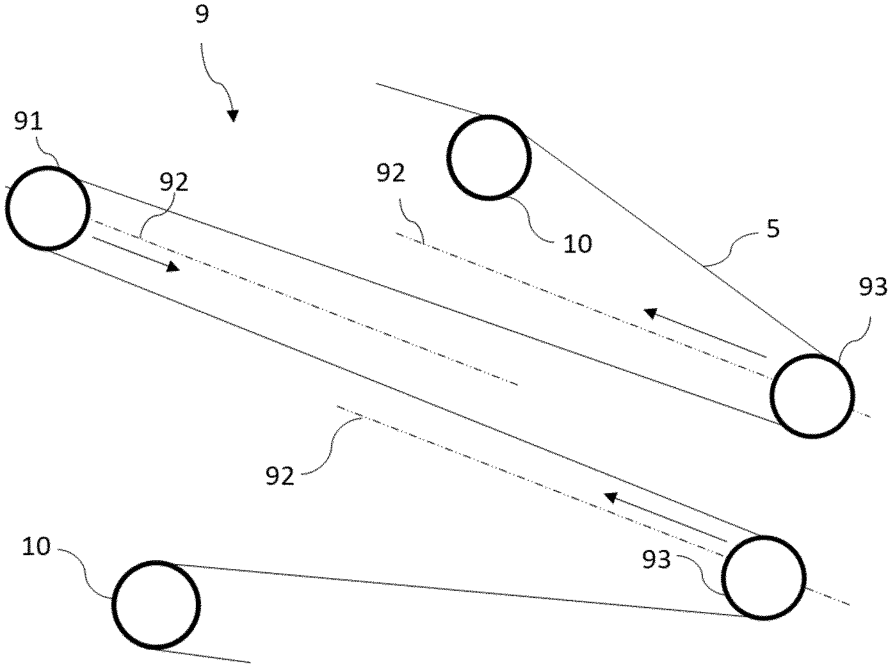
FIG. 5 is a schematic view of a buffer according to an alternative embodiment in a first configuration.
Figure 6:
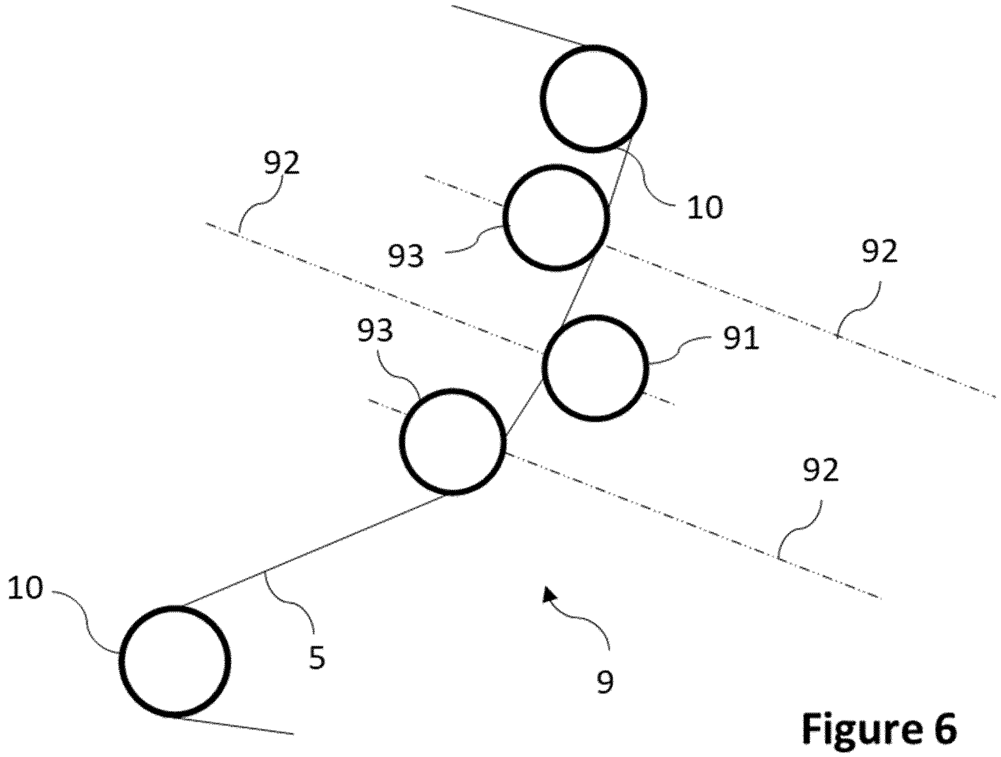
FIG. 6 is a schematic view of a buffer according to FIG. 5 in a second configuration.
Figure 7:
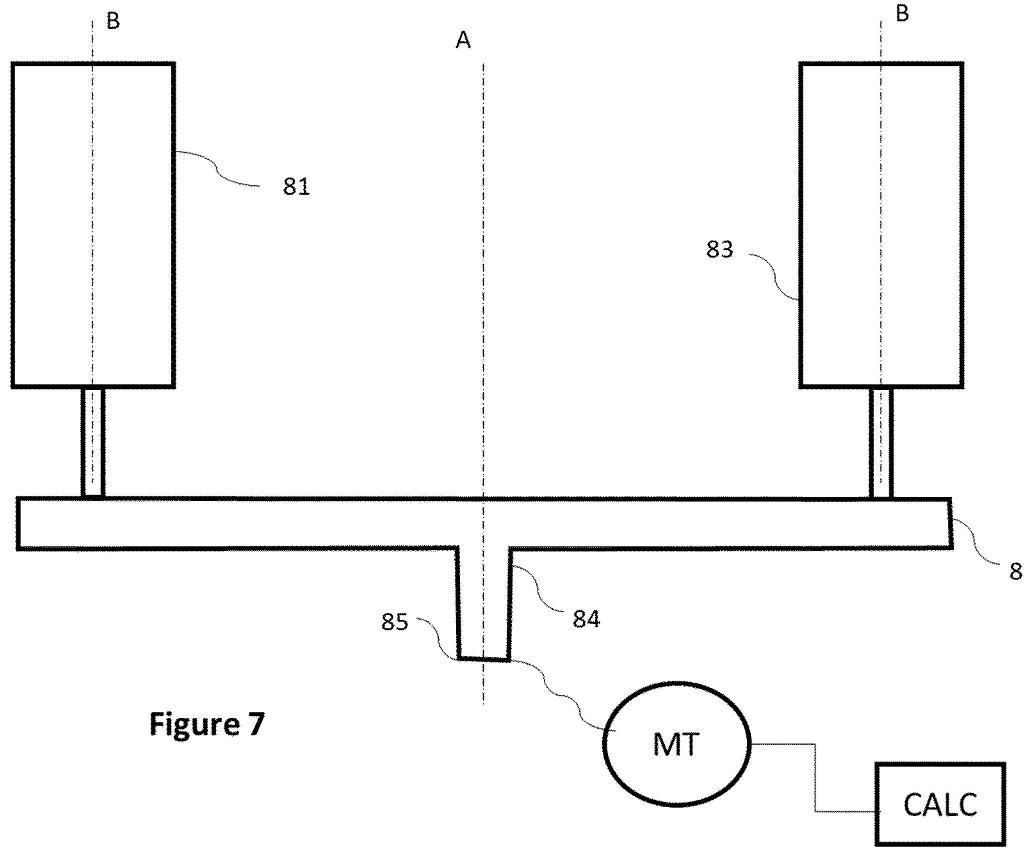
FIG. 7 is a schematic drawing of the printing apparatus according to one embodiment.

An alternative embodiment of a buffer 9 is illustrated in FIGS. 5 and 6. In said embodiment, the rollers 91 are each movable along a rectilinear trajectory 92. All the rollers 91 are movable along a trajectory 92 between a first and a second position. When all the rollers 91 are located on the first position as illustrate in FIG. 5, the buffer 9 is in a long configuration and the length of the ribbon path through the buffer is maximum. When all the rollers 91 are located on the second position as illustrated in FIG. 6, the buffer is in a short configuration and the length of the ribbon path through the buffer is minimum.

In one embodiment, the buffer comprises a rail to guide rollers 71, 81, 91 along a predefined trajectory.

The simultaneous movement of the 2 moving rollers 71, 81, because each moving roller is arranged to support an opposite face of the ribbon, causes an increase or a decrease in the amount or length of ribbon within the buffer zone. Furthermore, the movement of the 2 moving rollers, along a same direction of a circular trajectory around the same axis A makes the buffer compact regarding the difference of the amount or length of ribbon stored within said buffer zone.

First Controller

In one embodiment, the printing apparatus 1 comprises a first controller CALC. Said first controller CALC controls both the pre-printing buffer 8 and the post-printing buffer 7. In one embodiment, the control of the buffers is operated by operating a transport of the first and the second moving roller of a buffer along their predefined trajectory.

In one embodiment, the first controller is configured to move the moving rollers 71, 81, 91 along their predefined trajectory 71, 83, 93. In one embodiment, each buffer comprises at least one motor to move its rollers 71, 81, 91 along their predefined trajectory and the first controller controls said motor.

In one embodiment illustrated in FIGS. 1 and 2, the first controller, to control the length of the re-inked ribbon or the printed ribbon, causes a rotation of the frame 84 of respectively the pre-printing buffer 8 or the post-printing buffer 7. The direction of rotation of the frame 84 determines if the amount of ribbon stored within the buffer zone is increased or decreased.

Preferably, each buffer comprises a motor MT connected to the frame 84 to cause the rotation of the frame around its pivot 85. The motor MT is controlled by the first controller CALC. In such a way, the first controller CALC is configured to control the motor MT. Therefore, the first controller is configured to control the rotation of the frame 84 and to control the direction of rotation said frame 84.

The first controller CALC is configured to control both buffers to drive the ribbon on the printing zone at a speed inferior to the first speed of the ribbon on the coating zone by driving the pre-printing buffer 8 to increase the length of the ribbon along the first path and simultaneously by driving the post-printing buffer 7 to reduce the length along the second path.

The first controller CALC is configured to control both buffers to drive the ribbon on the printing zone at a speed superior to the first speed of the ribbon on the coating zone by driving the pre-printing buffer 8 to reduce the length of the ribbon along the first path and simultaneously by driving the post-printing buffer 7 to increase the length along the second path.

The control of a buffer is achieved by controlling the movement of the moving rollers along their predefined trajectory 72, 82.

The simultaneous driving of both buffers allows to simultaneously increase the length path of the ribbon on one side of the printing zone and reduce the length of the path of the ribbon on the other side of the printing zone. In other words, one of the two buffers is used to control the speed of the ribbon on the printing zone and the other buffer is used to compensate for the length of the ribbon path to avoid a rise of tension along the ribbon on one side of the printing zone.

In other words, by simultaneously decreasing the amount or length of ribbon stored between the entry and the exit of the pre-printing buffer 8 and increasing the amount of ribbon stored between the entry and the exit of the post-printing buffer 7, the speed of the ribbon in the printing zone is superior to the speed of the ribbon in the coating zone. Alternatively, by simultaneously increasing the amount of ribbon stored between the entry and the exit of the pre-printing buffer 8 and decreasing the amount of ribbon stored between the entry and the exit of the post-printing buffer 7, the speed of the ribbon in the printing zone is inferior to the speed of the ribbon in the coating zone.

In one embodiment, the first controller further controls the speed of the ribbon in the coating zone by controlling the driver of the conveyor system (e.g. the rotation of the drive roller 11).

In one embodiment, the first controller CALC is configured to control the pre-printing buffer and the post-printing buffer independently one to each other. Indeed, during printing, the ribbon is clamped between the printhead 6 and the substrate 2 and is clamped between the drive roller 11 and the coater 3. Therefore, the tension applied to the ribbon may not be the same on both sides of the printhead. One advantage of the independent control of the buffers 7, 8 is to avoid over tension in one of the two sides of the ribbon during printing.

Printing and Disengaged Configuration

As illustrated on FIGS. 1 to 4, the printing apparatus 1 includes a substrate 2 to be transported in contact with the ribbon along the printing zone to allow thermal transfer of ink from the ribbon to the substrate. The printing apparatus may further include substrate rollers 22, 23 to hold and support the substrate. The printing apparatus may also comprise the print roller 21 as already described here before to hold and transport the substrate in contact with the ribbon along the printing zone.

In one embodiment, the printing apparatus is designed to provide two configurations: a printing configuration and a disengaged configuration.

Figure 3:
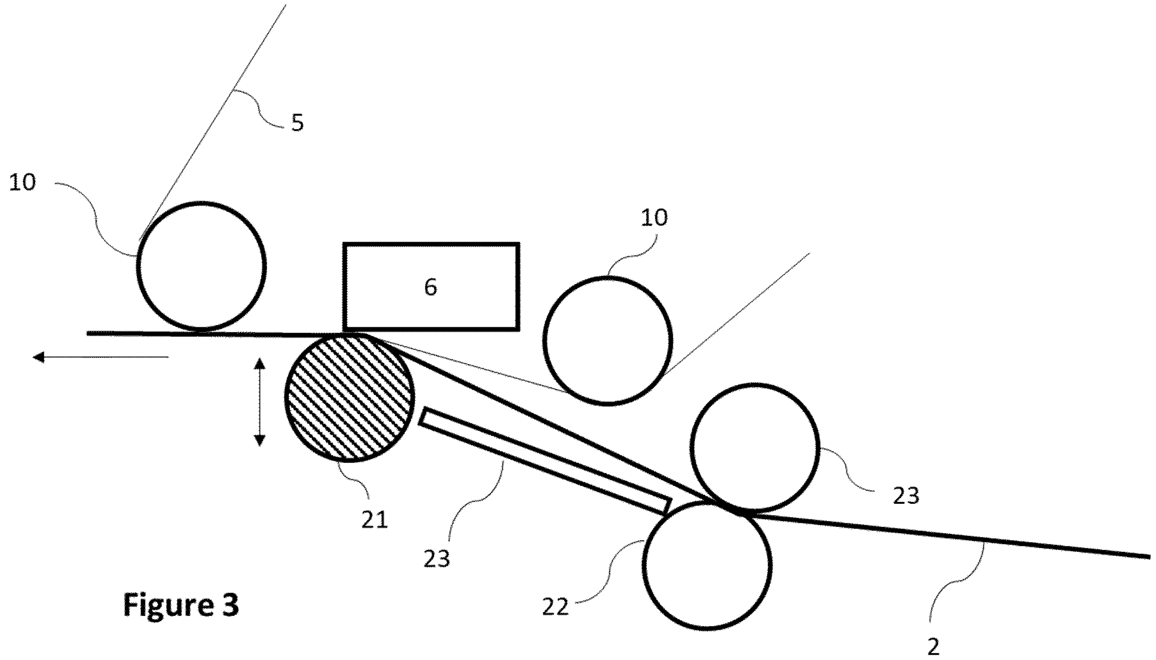
FIG. 3 is a schematic representation of the substrate conveyor system of the printing apparatus of the FIGS. 1 and 2 in a printing configuration wherein the print roller is movable and located in a position allowing printing.

In the printing configuration illustrated in FIG. 3, the ribbon 5 is supported by contact with the substrate 2. The ribbon 5 is supported by the print roller 21 through the substrate 2. By "supported by the print roller through the roller", it should be understood that the print roller 21 supports the ribbon and the substrate 2 is located between the ribbon 5 and the print roller 21. In the printing configuration, the print roller 21 ensures a sufficient pressure on the substrate 2 to maintain the substrate 2 in contact with the ribbon 5 during printing. This advantageously allows the transfer of ink from the ribbon 5 to the substrate 2.

In one embodiment, in the printing configuration, the print roller 21 maintains the ribbon 5 in contact with the substrate 2 and optionally with the printhead 6 or with the micro-heater area of the printhead 6.

Preferably, in the printing configuration, the ribbon runs its path in contact with the protective layer of the printhead. The protective layer enables to conduct the heat from the micro-heater area and advantageously preventing the tear of the ribbon. This advantageously allows heating the ink through the ribbon to melt said ink and cause its transfer from the ribbon 5 to the substrate 2. Therefore, the speed of the ribbon in the printing zone may be defined by the distance traveled by the ribbon along its path in a time interval in the printing zone, i.e., wherein the coated ink on the ribbon is applied to the substrate 2 by thermal transfer.

In an alternative embodiment wherein the printhead 6 comprises a laser to heat the ink, the ribbon 5 is not in contact with the printhead 6 in the printing configuration.

In one embodiment, the printing apparatus 1 comprises a driver to drive the substrate 2. By "drive the substrate", it should be understood controlling the movement of the substrate and its speed along its path. The driver may be the print roller 21. The printing apparatus 1 may comprise a motor connected to the print roller 21 to rotate said roller and transport the substrate 2 along its path. The driver can be used to transport the substrate 2 proximate to the ribbon 5.

Figure 4:
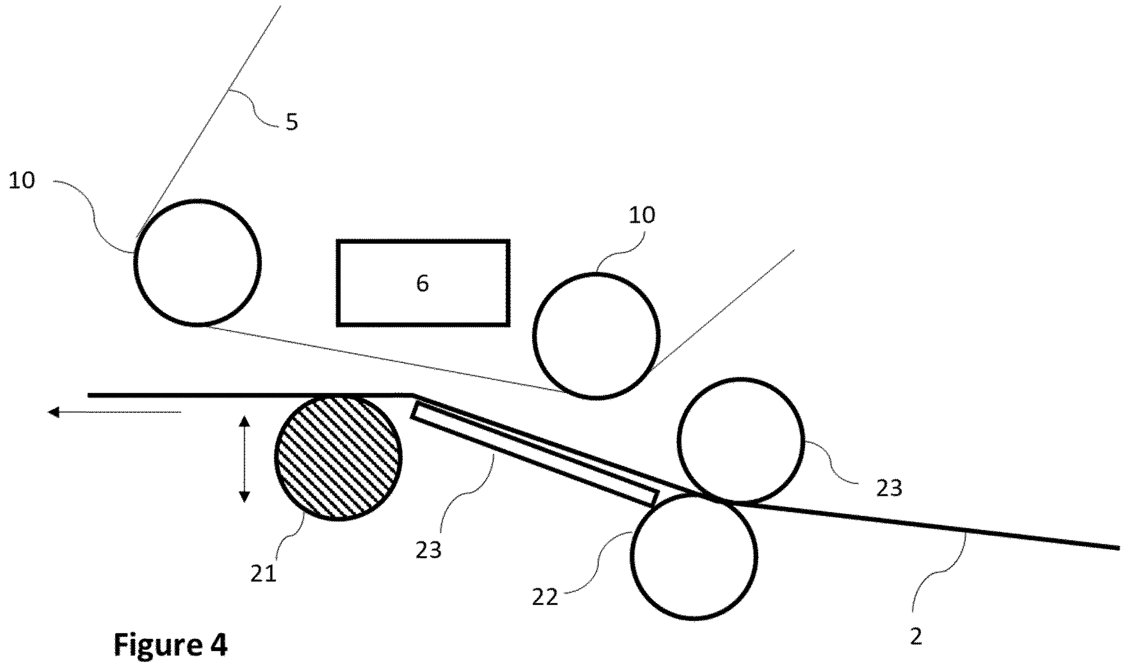
FIG. 4 is a schematic representation of the substrate conveyor system of the printing apparatus of the FIGS. 1 and 2 in a disengaged configuration wherein the print roller is movable and located in a position wherein the ribbon is disengaged from the substrate and the printhead.

In the disengaged configuration, illustrated in FIG. 4, the ribbon 5 is disengaged from the substrate 2. In such configuration, the printing or the thermal transfer of the ink from the ribbon 5 to the substrate 2 is not possible. In the disengaged configuration, the ribbon 5 is not in contact with the printhead 6. In both configurations, the speed of the ribbon in the printing zone may therefore be defined by the distance traveled by the ribbon along its path in a time interval wherein the ribbon is between the substrate 2 and the printhead 6.

In one embodiment, an element of the printing apparatus is movable to switch the printing apparatus from the printing configuration to the disengaged configuration or from the disengaged configuration to the printing configuration. This element may be a roller 10 of the conveyor system which is movable. As illustrated in FIGS. 3 and 4, this element may be the print roller 21. The print roller 11 is movable between two positions, a first position corresponding to the printing configuration and a second position corresponding to the disengaged configuration.

Second Controller

The printing apparatus 1 may comprise a second controller COMP. The second controller COMP is configured to control the movable element to switch between the printing configuration and the disengaged configuration.

In FIGS. 3 and 4, wherein the element is the print roller 21, the second controller controls the movement of the print roller 21 between the two positions.

In one embodiment, the second controller COMP is configured to automatically switch the configuration of the printing apparatus 1 when the speed of the ribbon 5 in the printing zone is null while the speed of the ribbon in the coating zone is not null. This allows stopping the ribbon 5 on the printing zone when the printing apparatus 1 switch configuration.

Therefore, when the ribbon 5 comes in contact with the micro-heater area of the printhead or when the ribbon leaves it, the speed of the ribbon 5 is null and there is no friction between the ribbon and the printhead. The risk of tearing is then advantageously reduced.

Preferably, in the printing configuration, the print roller 21 is controlled to automatically transport the substrate at the same speed as the speed of the ribbon in the printing zone.

In one embodiment, the first and the second controller are one unique computer or are connected to one unique user interface. In one embodiment the first and/or second controller further control the printhead 6.

The first controller CALC is connected to the drive roller 11 of the conveyor system or to the motor of said drive roller to drive the rotation of said drive roller 11, and therefore the speed of the ribbon in the coating zone. The first controller CALC is also connected to the buffers, 7, 8 or to the moving rollers 71, 81, 73, 83 of said buffers to control a speed differential between the speed of the ribbon in the coating zone and the speed of the ribbon in the printing zone.

The first controller CALC and/or the second controller COMP may comprise a memory or any readable media readable by a computer comprising a computer program comprising instructions to cause the printing apparatus to execute the steps of the method according to the invention. The first controller may comprise a processor or a computer configured to cause the printing apparatus to execute the steps of the method according to the invention.

The first controller CALC and the second controller COMP may control the moving rollers and/or the drive roller 11 and/or the print roller 21 according to instructions received by communication means. Said instructions may comprise measured values by a sensor such as a speed sensor configured to measure the speed of the substrate 2 and/or the speed of the ribbon in the coating zone and/or in the printing zone.

Additional Buffer Means

Figure 10:
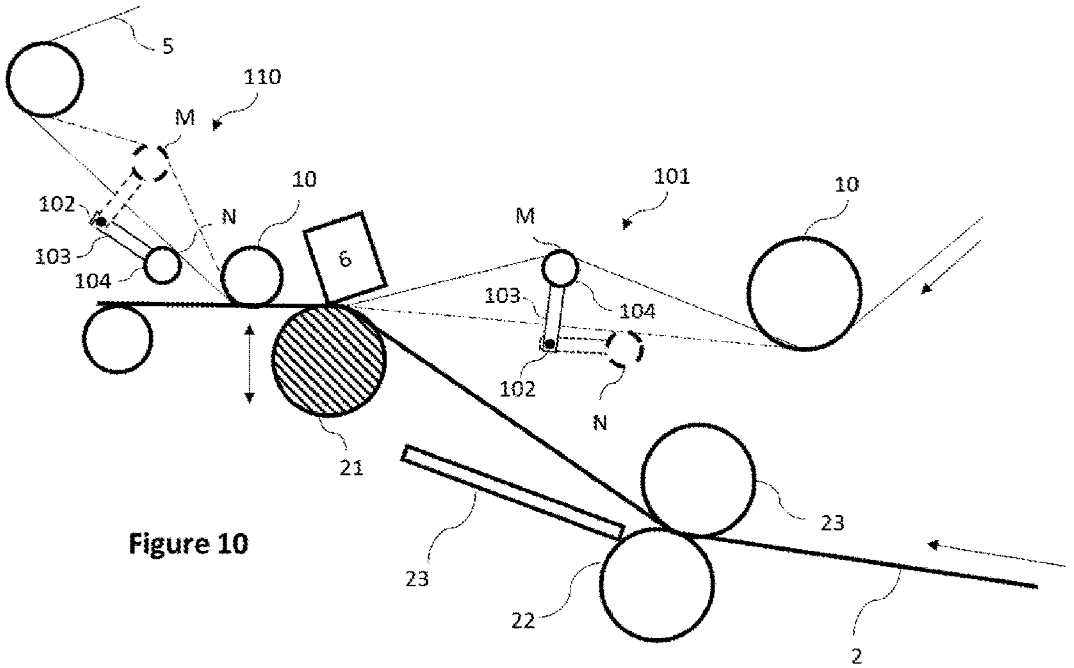
FIG. 10 is a schematic representation of the substrate conveyor system of the printing apparatus according to another embodiment of the invention wherein the printing apparatus further comprise two more buffers in the vicinity of the printhead.

In one embodiment illustrated in FIG. 10, the thermal transfer printing apparatus comprises 2 additional buffers 101, 110.

Said additional buffers comprise a roller 104 on an arm 103. Said additional buffers are arranged to support the ribbon with the roller 104 of said additional buffer.

The arm 103 of the additional buffer may be movable in pivot rotation around an axis 102. Said pivot rotation drives the roller 104 between at least a first position N and a second position M.

In the first position N, the roller defines a path of the ribbon which is inferior to the path of the ribbon when the roller is in the second position M.

Preferably, the additional buffers 101, 110 are arranged between the pre-printing buffer 8 or post-printing buffer 7 and the printhead 6.

Each additional buffer is, in the same way as the pre-printing buffer 8 and the post-printing buffer 7, intended to control the length of the ribbon. The first additional buffer 101 is arranged between the pre-printing buffer 8 and the printhead 6 to control the length of the ribbon between the pre-printing buffer 8 and the printhead 6. The second additional buffer 110 is arranged between the post-printing buffer 7 and the printhead 6 to control the length of the ribbon 5 between the post-printing buffer 7 and the printhead 6.

In one embodiment, the differential of the length of the path of the ribbon from the first position N with the second position M is inferior to the differential of the length of the path of the ribbon achievable by the post-printing buffer 7 or by the pre-printing buffer 8.

In a first configuration, the first additional buffer 101 is in the first position N and the second additional buffer 110 is in the second position M (in dotted lines in FIG. 10). In a second configuration, the first additional buffer 101 is in the second position M and the second additional buffer 110 is in the first position N.

By simultaneously switching the additional buffers the first, additional buffer 101 from the first to the second configuration, the system is able to temporarily stop the speed of the ribbon in the printing zone, which advantageously allows moving the print roller 21 to the printing configuration or to the disengaged configuration while the ribbon is static, reducing the damages to the ribbon and improving its time-of-life.

In one embodiment, the pivot rotation 102 of the arm 103 comprises a torsion spring. One advantage of the torsion spring is to switch the roller 104 between the first position and second position very fast.

Method to Print a Substrate

According to a second aspect, the invention further relates to a method for printing a substrate. Preferably, the method to print a substrate comprises providing a printing apparatus according to the invention.

Figure 9:
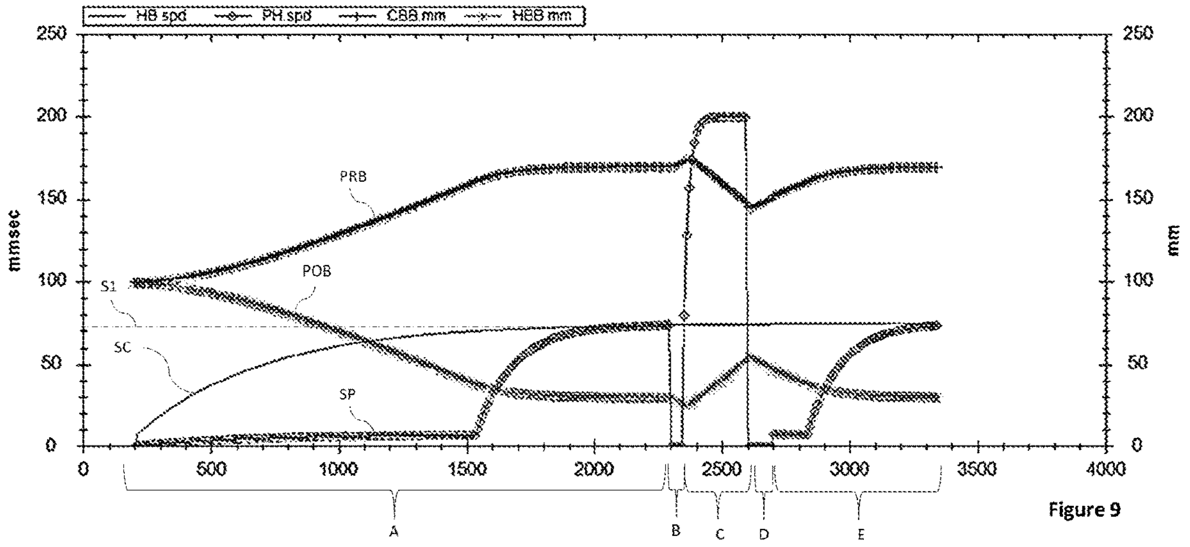
FIG. 9 is a graph representing the printing of one label according to an embodiment of the invention. The graph represents the speed of the ribbon in both the coating zone and the printing zone and the length of the path of the ribbon through both the pre-printing buffer and the post-printing buffer.

An embodiment of the method according to the invention to print a substrate is now described in reference to FIGS. 9 and 8.

FIGS. 9 and 8 illustrate a graph comprising: the speed of the ribbon in the coating zone SC and the speed of the ribbon in the printing zone SP, the length of the path of the ribbon through the pre-printing buffer PRB and the length of the path of the ribbon path through the post-printing buffer POB.

In a phase A, printing apparatus is in disengaged configuration. The ribbon is transported along its path. The ribbon is coated with ink at its passage through the coating zone. During the phase A, the speed SC is increased until a first predetermined speed S1. At the end of the phase A, the speed SC and the speed SP are preferably equal. This means than none of the buffers are increasing or reducing the length of the ribbon path through the buffers. This advantageously allows coating the ribbon homogeneously before printing.

In a phase B, the printing apparatus is moved to the printing configuration. As described before, the print roller 21 may be moved to press the ribbon against it to support the substrate.

In one embodiment, in the printing configuration, the print roller 21 maintains the ribbon 5 in contact with the printhead 6 or with the micro-heater area of the printhead or with the protective layer of the printhead 6.

During the switch to the printing configuration, the print roller 21 applies a force between the ribbon and the printhead. This force raises the friction force applied to the ribbon with the printhead. Said friction increases the risk of tears of the ribbon. To avoid this, the phase B may comprise stopping the ribbon on the printing zone. As illustrated in FIG. 9, the speed SP is decreased until zero while the speed SC is maintained at the first predetermined speed S1. It can be seen in FIG. 9 that this differential of speed between SC and SP is obtained by driving the pre-printing buffer 8 to increase the length of the ribbon along the first path PRB and simultaneously driving the post-printing buffer 7 to reduce the length of the ribbon along the second path POB. Preferably, the length PRB is increased, and the length POB is decreased in function of the speed SC to ensure a speed SP equal to zero.

By "driving a buffer", it could be understood controlling the move of the moving rollers of said buffer in order to reduce or increase the length of the path of the ribbon.

Such phase B allows stopping the ribbon while operating the contact of the ribbon with the printhead. Therefore, stopping the ribbon during such switch of configuration advantageously prevent the tear of the ribbon in contact with the printhead. Indeed, when the print roller applies a force on the ribbon, if the ribbon is stopped, there is no friction between the ribbon and the printhead.

In one embodiment, during the phase B, the substrate is transported at a same speed as the speed SP. This allows reducing the friction while operating the contact between the ribbon and the substrate. The risk of tearing and of damaging the ribbon is advantageously reduced.

The method and the printer apparatus advantageously allow stopping the ribbon and the printing zone without changing the speed on the coating zone.

Preferably, during the phase A the pre-printing buffer 8 is controlled to increase the length of the first path or the length of the path of the ribbon through the pre-printing buffer 8 and the post-printing buffer 7 is controlled to decrease the length of the second path of the ribbon or the length of the path of the ribbon through the post-printing buffer 7. This advantageously prepare the buffers to the following phase B.

The phase C corresponds to the step of printing. During printing, the speed SP may be higher than the speed SC by driving the pre-printing buffer 8 to reduce the length of the ribbon along the first path PRB and simultaneously driving the post-printing buffer 7 to increase the length along the second path POB. The speed SP may be constant during printing at a second predetermined speed S2.

This advantageously allows providing a high printing speed without changing the speed SC in the coating zone.

In a first embodiment, the printing is short as illustrated in FIG. 9. For example, phase C comprises the printing of one unique label. In said embodiment the speed SC may be maintained at the first predetermined peed S1 during printing which is inferior to the second predetermined speed S2.

In a second alternative embodiment illustrated in FIG. 8, the printing is longer. For example, phase C comprises the printing of several labels in a row. In said second embodiment, during the printing in phase C, the speed SC in the coating zone is progressively increased until a printing speed S2. Preferably, the buffers are controlled, during the increase of the speed SC, to maintain the speed SP in the printing zone at a constant speed.

During a phase D, the printing apparatus is moved to the disengaged configuration. As described before, the print roller 21 may be moved in such a way that the ribbon is not in contact with both the printhead and the substrate. During this phase D, the speed ribbon may be reduced, preferably until zero, as described for the phase B. This allows to avoid friction between the ribbon and the substrate and the printhead while the ribbon is disengaged from the printhead.

In phase E, the printing apparatus is in the disengaged configuration. During this phase, the buffers are driven in such a way that the speed SP and the speed SC are equal. In one embodiment illustrated in FIG. 8, the speed SC of the coating zone is progressively decreased to reach the first predetermined speed S1.

During printing (phase C), the ribbon may be held by its two faces in two locations of the ribbon path: in the coating zone (between the coater and the support) and in the printing zone (between the printhead or the micro-heater area and the print roller 21. These zones split the ribbon path between two portions, the first path from the coating zone to the printing zone, wherein the ribbon transport the coated ink and a second path, from the printing zone to the coating zone, wherein the ribbon conveys the ink which was not printed.

Therefore, the tension of the ribbon in the first path may be different from the tension of the ribbon along the second path. Consequently, the torque applied to the moving roller of one buffer may be different than the torque applied simultaneously to the moving rollers of the other buffer.

In one other embodiment, the speed of increasing the length of the path of the ribbon in one of the buffers may be not exactly equal to the speed of reducing the length of the path of the ribbon of the other buffer.

The invention claimed is:

1. A thermal transfer printing apparatus comprising:

- an endless ribbon comprising an inner face and an outer face;
- a coating device to coat the endless ribbon with ink on a coating zone;
- a printhead to print by thermal transfer a substrate with a part of the ink coated on the endless ribbon on a printing zone;
- a conveyor system to support and transport the endless ribbon along a path from the coating device to the printhead and from the printhead to the coating device;
- a pre-printing buffer comprising at least two moving rollers to support the coated ribbon during its transport from the coating device to the printhead, the at least two moving rollers of the pre-printing buffer including a first moving roller arranged to support the inner face of the endless ribbon and a second moving roller arranged to support the outer face of the endless ribbon;
- a post-printing buffer comprising at least two moving rollers to support the ribbon during its transport from the printhead to the coating device, the at least two moving rollers of the post-printing buffer including a third moving roller arranged to support the inner face of the endless ribbon and a fourth moving roller arranged to support the outer face of the endless ribbon;

wherein each moving roller is movable along a redefined trajectory in a plane sensibly perpendicular to a longitudinal axis of the moving rollers, and a first controller configured to:

control a movement of the first moving roller and second moving rollers along their predefined trajectory to increase or decrease a length of the coated ribbon path from the coating device to the printhead, and control the movement of the third moving roller and the fourth moving rollers along their predefined trajectory to increase or decrease a length of the ribbon path after printing from the printhead to the coating device.

2. The thermal transfer printing apparatus according to claim 1, wherein both the first moving roller and the second moving roller of the pre-printing buffer are movable along a circular trajectory around a same first axis and/or both the third moving roller and the fourth moving roller of the post-printing buffer are movable along a circular trajectory around a same second axis.

3. The thermal transfer printing apparatus according to claim 2, wherein both the first moving roller and the second moving roller of the pre-printing buffer are mounted in a frame, said frame being movable in rotation around the first axis sensibly parallel of an axis of rotation of the first and second moving rollers and/or the third moving roller and the fourth moving roller of the post-printing buffer are mounted in a frame, said frame being movable in rotation around the first axis sensibly parallel of an axis of rotation of the third and fourth moving rollers.

4. The thermal transfer printing apparatus according to claim 1, further comprising a drive roller, to drive the ribbon at a first speed on the coating zone, and wherein the first controller is configured to control the movement of each moving roller along their predefined trajectory to:

drive the ribbon on the printing zone at a speed inferior to the first speed by driving the pre-printing buffer to reduce the length of the ribbon from the coating device to the printhead and simultaneously by driving the post-printing buffer to increase the length of the ribbon from the printhead to the coating device, and drive the ribbon on the printing zone at a speed superior to the first speed by driving the pre-printing buffer to increase the length of the ribbon from the coating device to the printhead and simultaneously by driving the post-printing buffer to decrease the length of the ribbon from the printhead to the coating device.

5. The thermal transfer printing apparatus according to claim 4, further comprising a speed sensor to measure the speed of the ribbon within the printing zone and further comprising a second controller configured to control the print roller to automatically switch the configuration of the drive roller when measured speed of the ribbon in the printing zone is null.

6. The thermal transfer printing apparatus according to claim 4, wherein the first controller is configured to control the movement of the first and second moving rollers independently from the control of the movement of the third and fourth moving rollers.

7. The thermal transfer printing apparatus according claim 4, wherein the first controller is configured to control the rotation of the drive roller, to control the first speed of the ribbon on the coating zone.

8. The thermal transfer printing apparatus according to claim 1, further comprising a print roller to hold and transport the substrate and the ribbon along the printing zone, the print roller being movable between two configurations in relation to the printhead, which include:

a printing configuration enabling the printing wherein the ribbon is supported by the print-roller through the substrate, and a disengaged configuration wherein the ribbon is disengaged from the substrate.

9. The thermal transfer printing apparatus according to claim 8, wherein a second controller is configured to automatically drive the print roller to transport the substrate at a same speed than the ribbon speed on the printing zone in the printing configuration.

10. The thermal transfer printing apparatus according to claim 1, wherein a module of elasticity of the endless ribbon is inferior to 3 GPa.

11. A method to print a substrate with a thermal transfer printing apparatus according to claim 1, the method comprising:

driving the ribbon on the coating zone at a first predetermined speed, and simultaneously;

driving the ribbon on the printing zone at a second speed, different from the first predetermined speed by:

driving the moving rollers of the pre-printing buffer to reduce a length of the ribbon from the coating device to the printhead and simultaneously driving the moving rollers of the post-printing buffer to increase a length of the ribbon from the printhead to the coating device, or driving the moving rollers of the pre-printing buffer to increase a length of the ribbon from the coating device to the printhead and simultaneously driving the moving rollers of the post-printing buffer to reduce a length of the ribbon from the printhead to the coating device.

12. The method according to claim 11, wherein the thermal transfer printing apparatus further comprising a print roller to hold and transport the substrate and the ribbon along the printing zone, the print roller being movable between two configurations in relation to the printhead, which include a printing configuration enabling the printing wherein the ribbon is supported by the print-roller through the substrate, and a disengaged configuration wherein the ribbon is disengaged from the substrate, the method further comprising engaging the printing by:

driving the ribbon on the coating zone at a first predetermined speed and simultaneously;

driving the ribbon on the printing zone at a second speed inferior to the first predetermined speed, moving the print roller from the disengaged configuration to the printing configuration while the second speed is inferior to the first predetermined speed.

13. The method according to claim 12, further comprising operating the printing comprises driving the ribbon speed on the printing zone at a speed higher than the speed of the ribbon on the coating zone by driving the moving rollers of the pre-printing buffer to reduce the length of the ribbon from the coating device to the printhead and simultaneously driving the moving rollers of the post-printing buffer to increase the length of the ribbon from the printhead to the coating device.

14. The method according to claim 12, further comprising disengaging the printing by:

driving the ribbon on the coating zone at a first speed, and simultaneously driving the ribbon speed on the printing zone at a second speed inferior to the first speed by driving the rollers of the pre-printing buffer to reduce the length of the ribbon from the coating device to the printhead and simultaneously driving the rollers of the post-printing buffer to increase the length of the ribbon from the printhead to the coating device, and moving the print roller to the disengaged configuration.

* * * * *